(12) United States Patent
Mihalos et al.

(10) Patent No.: US 7,332,189 B2
(45) Date of Patent: Feb. 19, 2008

(54) PROCESS AND APPARATUS FOR FORMING A WAVE CHIP PRODUCT

(75) Inventors: Mihaelos Nicholas Mihalos, Palisades Park, NJ (US); Theodore Nicholas Janulis, Randolph, NJ (US); Chris E. Robinson, Sparta, NJ (US); Carol Wines, Longmont, CO (US); Allison Antonini, Union, NJ (US); Joseph Fierro, Warwick, NY (US)

(73) Assignee: Kraft Foods Holdings, Inc., Northfield, IL (US)

( * ) Notice: Subject to any disclaimer, the term of this patent is extended or adjusted under 35 U.S.C. 154(b) by 734 days.

(21) Appl. No.: 10/724,665

(22) Filed: Dec. 1, 2003

(65) Prior Publication Data

US 2005/0118318 A1 Jun. 2, 2005

(51) Int. Cl.
*A21C 15/02* (2006.01)
(52) U.S. Cl. .............. 426/497; 426/512; 426/549; 426/660
(58) Field of Classification Search .............. None
See application file for complete search history.

(56) References Cited

U.S. PATENT DOCUMENTS

| | | | |
|---|---|---|---|
| 3,576,647 A | 4/1971 | Liepa | |
| 3,626,466 A | 12/1971 | Liepa | |
| 3,956,517 A | 5/1976 | Curry et al. | |
| 4,110,482 A * | 8/1978 | Sato | 426/497 |
| RE31,819 E | 1/1985 | Weiss et al. | |
| 4,812,323 A | 3/1989 | Savage | |
| 4,844,919 A | 7/1989 | Szwerc | |
| 4,973,481 A | 11/1990 | Hunt et al. | |
| 5,167,980 A | 12/1992 | Herod et al. | |
| 5,392,698 A | 2/1995 | Sprecher et al. | |
| 5,402,938 A | 4/1995 | Sweeney | |
| 5,429,834 A | 7/1995 | Addesso et al. | |
| 5,500,240 A | 3/1996 | Addesso et al. | |

(Continued)

FOREIGN PATENT DOCUMENTS

EP 0387606 9/1990

(Continued)

OTHER PUBLICATIONS

The Good Cook Cookies & Crackers , 1982, pp. 34-35.*

(Continued)

*Primary Examiner*—Lien Tran
(74) *Attorney, Agent, or Firm*—Greenblum & Bernstein, P.L.C.

(57) ABSTRACT

Thin snack chips having a curved or wave shape are obtained by forming, shaping or curling baked chips into a curved or wave configuration before they become too cold and rigid so as to result in breakage during forming. The essentially flat, malleable baked chips, still hot from baking in an oven may be continuously transported on a conveyer belt into a nip or gap formed between the conveyer belt and a rotating forming roller to curve or curl the malleable baked chips around the roller. The malleable baked chips are subjected to a guided curtain of air to cool and set the chips in a curved or wave configuration and to remove or blow the curved or wave chips off of the rotating forming roller onto the conveyor belt.

28 Claims, 3 Drawing Sheets

U.S. PATENT DOCUMENTS

| | | |
|---|---|---|
| 5,523,106 A * | 6/1996 | Gimmler et al. ............ 426/549 |
| 5,549,918 A | 8/1996 | Hartman et al. |
| 5,558,894 A | 9/1996 | Henson et al. |
| 5,747,092 A | 5/1998 | Carey et al. |
| 5,921,429 A | 7/1999 | Gruenbacher et al. |
| 5,980,967 A | 11/1999 | Carey et al. |
| 6,235,326 B1 | 5/2001 | Kroenberger |
| 6,251,452 B1 | 6/2001 | Weinstein et al. |
| 6,277,425 B1 | 8/2001 | Nash et al. |
| 6,479,090 B1 | 11/2002 | Carey et al. |
| 6,491,959 B1 | 12/2002 | Chiang et al. |
| 6,510,937 B1 | 1/2003 | Braithwaite |
| 6,572,910 B2 | 6/2003 | Lanner et al. |
| 6,610,344 B2 | 8/2003 | Bell et al. |
| 2002/0034571 A1 | 3/2002 | Zimmerman et al. |
| 2002/0132029 A1 | 9/2002 | Teras et al. |
| 2002/0168453 A1 | 11/2002 | McCutchan |
| 2003/0024360 A1 | 2/2003 | Ribble |

FOREIGN PATENT DOCUMENTS

| | | |
|---|---|---|
| EP | 0599326 | 1/1994 |
| EP | 1175153 | 1/2002 |
| GB | 2237719 | 5/1991 |
| WO | WO 96/01572 | 1/1996 |
| WO | WO 00/64270 | 11/2000 |

OTHER PUBLICATIONS

SWOOPS, sample of packaging from trademark application No. 78/162,746, filed Sep. 11, 2002, Hershey Chocolate & Confectionery Corporation.

* cited by examiner

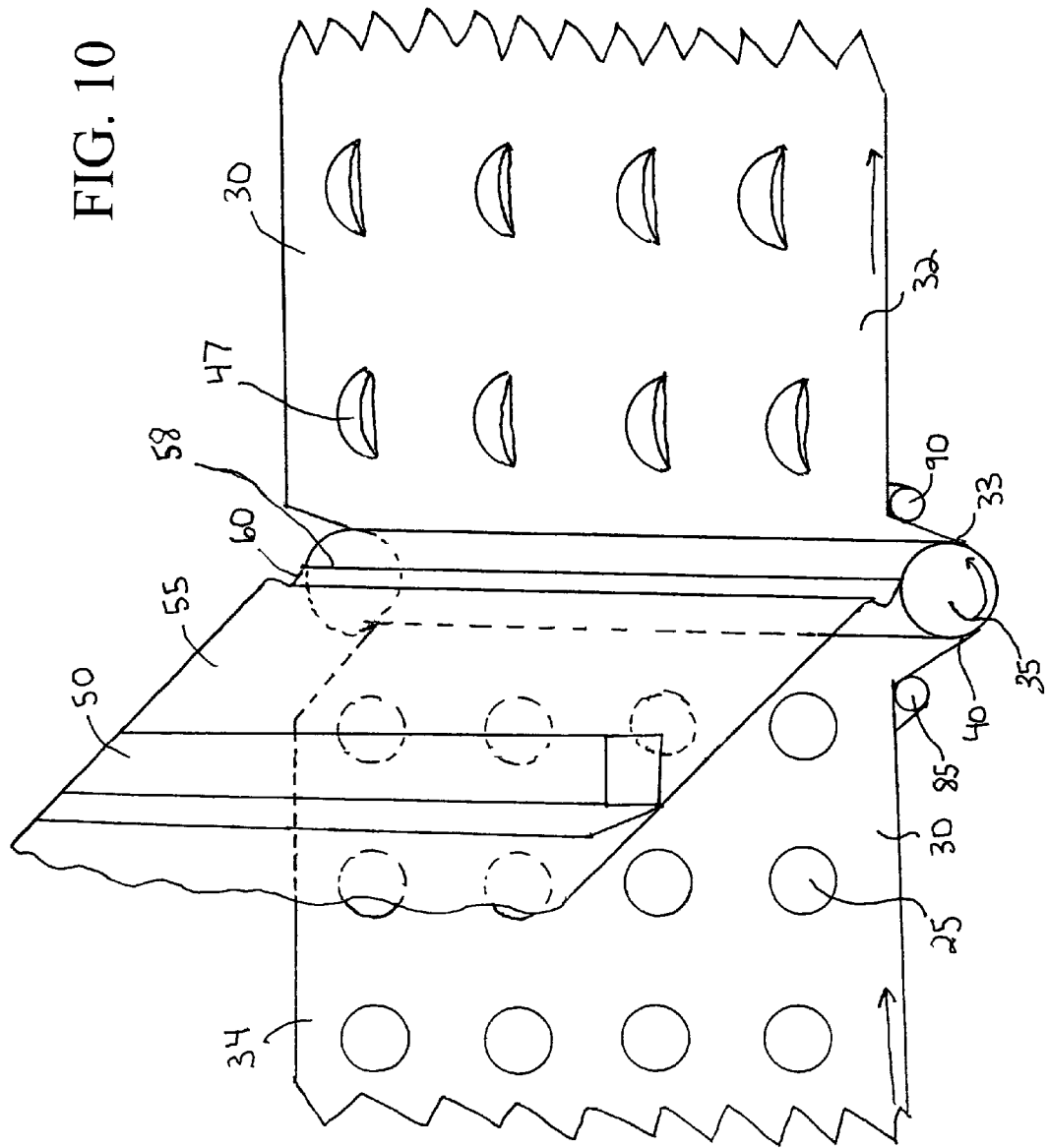

PROCESS AND APPARATUS FOR FORMING A WAVE CHIP PRODUCT

FIELD OF THE INVENTION

The present invention relates to the production of thin, baked snacks having a curved or wave shape. The present invention also relates to an apparatus for producing the snacks.

BACKGROUND OF THE INVENTION

In the mass production of snack products, such as potato chips and corn chips, curved configurations are either produced naturally by the frying process or may be imparted mechanically by molding or forming machines. The curved shape is considered a desirable feature both from a visual aspect and from the fact that it facilitates use of the snack with dips because the curved shape makes it easier to collect and maintain the dip on the surface of the snack. Furthermore, the curved shape of the snack results in a lower bulk density in the packaging, giving the packaged product a pleasantly filled appearance. However, frying generally results in a high fat content product, which is generally bubbled or blistered and not amenable to stacking or packaging in a straight stack. Also, frying is not compatible with obtaining a snack product which has a sweet, cookie taste. Moreover, the forming machines employed by potato chip and corn chip manufacturers are generally complex, mechanically intensive, and require significant manufacturing line space.

For example, in the manufacture of corn chips, the curled shape present in corn chips may be obtained by the use of a pressurized extrusion process. The curl forms as the product exits the extrusion head. The use of extrusion equipment, however, limits the type of flours which may be used to make up the dough since some, such as wheat flours, tend to burn under the temperatures found in an extrusion chamber. Furthermore, the extruded product may need to be subjected to deep fat frying.

U.S. Pat. No. 3,576,647 to Liepa discloses that in making potato chips, slices of raw potatoes are deep fat fried to a crisp state. The chips so prepared have a random surface curvature which usually takes on a saddle-like appearance. However, frying is the only acceptable means of producing the curve shaped product described and the chips are prepared not from doughs but whole slices of potato.

The use of mechanical means to impart a curved shape to flat snack products is disclosed in U.S. Pat. No. Re. 31,819 to Weiss et al. In the Weiss et al process and apparatus fabricated potato chips are prepared from a flat dough ribbon, in which if a curved shape is desired, the flat dough ribbon is molded between concave and convex surfaces during the frying step to produce the desired shape.

U.S. Pat. Nos. 3,576,647 and 3,626,466 each to Liepa teach a method for preparing a saddle shaped fabricated potato chip by sheeting and cutting the desired shape from the dough sheet. Each dough piece is then held between two similarly configured molds as the dough piece is conveyed through the deep fat frying step to ensure that the piece maintains its deformed shape.

U.S. patent Publication No. 2002/0132029 A1 to Teras et al discloses the production of an ergonomic snack piece having a dip containment configuration by frying or baking dough which is constrained between belts or molds.

U.S. Patent Publication No. 2002/0034571 A1 to Zimmerman et al discloses the production of a tortilla chip having a dip containment configuration by frying or baking dough which is constrained between belts or molds.

As disclosed in U.S. Pat. No. 5,392,698 to Sprecher et al, one means for imparting a concave shape to an oven baked cracker-type snack product is to replace the normal flat band of a commercial oven with a specially fabricated band that has spaced ridges affixed to the band such that when the dough sheet is layed onto it, gravity pulls the unsupported middle of the dough sheet down resulting in a desirable concave shape. This is not a commercially desirable method since it requires a specially fabricated oven band which would have to be replaced with a flat band whenever the manufacturer wished to make other products without a curved shape. The manufacturer would end up with one oven dedicated to production of concave shape baked products, thus limiting production flexibility. Furthermore the concave shape is limited to one fixed angle since the ridges are not adjustable.

Generally it is also known in the art that a slight curvature can be imparted to a dough sheet being subjected to oven baking by varying the heat applied in the top and bottom zone of the band oven. For example, in manufacturing a thin wheat type cracker by applying greater heat to the dough sheet in the top zone and less heat in the bottom zone, the middle portion of the product will lift off the band to give a very slight convex shape. However the curvature which may be imparted to the product using this technique is slight, certainly less than 10 degrees. Furthermore the product produced tends to be non-uniform since it is difficult to control the amount of curvature which is imparted to the product using this baking method.

U.S. Pat. No. 4,844,919 discloses the production of a concave shaped baked snack product which is coated with a fused flavored particulate topping and the product can be made on existing, in-place commercial manufacturing equipment. The topping composition is made from a film-forming food starch and flavors and is applied to a sheeted dough prior to baking. During baking the topping composition becomes fused to the expanding dough base causing the edges of the dough sheet to lift up resulting in a desirable concave shaped coated snack product.

U.S. Pat. No. 6,277,425 B1 to Nash et al discloses the use of an air knife to cool and dry extrudate strands before cutting. The product produced by Nash et al may be in the shape of a tube.

The present invention provides a method and apparatus for forming baked, wheat-based wave chip products, such as cookie wave chips, without the use of complex, mechanically intensive forming machines. High line throughputs may be maintained without the need for diverting long manufacturing line space to chip curving operations, and without the need for curling compositions which are topically applied before baking. In accordance with the present invention, a curved or wave configuration may be imparted to baked products after baking. Various degrees of curvature may be achieved without the need for extensive modifications of existing manufacturing equipment which is employed to produce flat chip products, crackers, or cookies.

SUMMARY OF THE INVENTION

The present invention provides a post-bake process and apparatus for continuously forming a wave chip while maintaining mass production product throughputs. A wave chip forming device, located after baking, includes a major roller, or forming roller, and preferably two other minor rollers, all of which may be jacketed to maintain a constant temperature. The rollers are rotatably attached to a conveyor belt so that the conveyor belt threads through the rollers with a pre-established adjustable gap or nip to allow the baked chip to travel through to form the wave.

Both the upstream and downstream angles formed by the belt with the forming roller may be adjusted by relative movement of the forming roller and the optional upstream and downstream minor rollers. The angles may be adjusted so as to permit the chips to fully curve around and adhere to the forming roller and to then be blown off the roller and back onto the downstream portion of the belt in less than one revolution of the roller.

The system also includes an air nozzle or air knife which is attached to an airflow guide or plate. The air knife and airflow guide are attached to a housing at a precise angle to the conveyor belt. A regulated, specific airflow is provided by the air knife and airflow guide that facilitates both: 1) crucial cooling during the wave forming process, and 2) removal and transferring of the wave chip from the forming roll in a uniform orientation in preparation for other post-bake operations and packaging.

The substantially flat, thin, baked chips leaving the oven are hot and malleable. In accordance with the present invention, the malleable chips are formed into a curved or wave configuration before they become too cold so as to become rigid which would result in breakage during forming. In embodiments of the present invention; the malleable chips are transported and formed into a wave within a very short time period, for example within less than about 20 seconds, after the product leaves the oven band located over the oven exit drum.

Generally, the malleable baked chips entering the nip or gap of the post-bake forming device should have a temperature of about 170° F. to about 190° F. A guided curtain of air cools the malleable baked chips which are adhered to the forming roller at least about 10° F., preferably about 15° F. to about 25° F. to obtain curved or wave chips which at least substantially retain the same curved or wave configuration after removal from the forming roller.

In preferred embodiments of the invention, to increase the time during which the baked chip pieces remain sufficiently malleable for post-bake forming into curved or wave chip products, a pregelatinized waxy maize starch is included in the dough composition. Also, in preferred embodiments of the present invention for producing cookie wave chips, inclusion of a substantial amount of sugar in the dough, with no or substantially no potato ingredients, provides a cookie taste or flavor rather than a potato chip flavor. It is also believed that the sugar helps to maintain malleability of the baked chips after baking by holding water.

The wave chips may have a plurality of particulate ingredients, such as flavor chips, which extend all the way through the thickness of the chips and are visually apparent at the opposing concave and convex surfaces. The wave forming process and apparatus of the present invention does not result in substantial, or any smearing of the particulate ingredients, such as chocolate chips into the baked dough portion of the chip product.

Once the wave product is formed and removed from the forming roller by the air curtain, the product can optionally be drizzled with a coating or icing using a perforated decorative stringer. The curled chip product may then be cooled in a traditional cooling tunnel. After exiting the cooling tunnel the at least substantially uniformly curved and sized product may be stacked into an at least substantially vertically aligned stack and sent to packaging.

BRIEF DESCRIPTION OF THE DRAWINGS

The present invention is further illustrated by the accompanying drawings wherein:

FIG. 10 is a partial perspective view of the apparatus of FIG. 9.

DETAILED DESCRIPTION OF THE INVENTION

Figure 1:
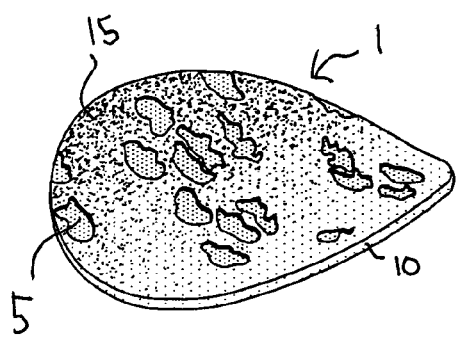
FIG. 1 is a top perspective view of a wave chip snack having particulates which may be produced in accordance with the present invention.
Figure 2:
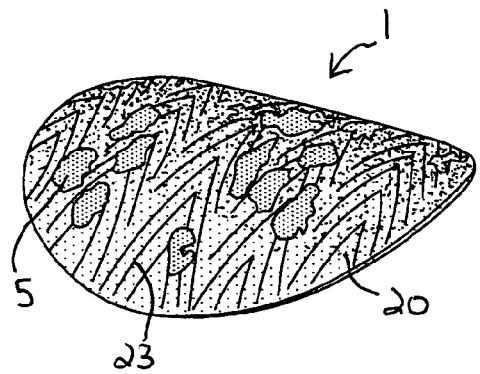
FIG. 2 is a bottom perspective view of the snack chip of FIG. 1.
Figure 3:
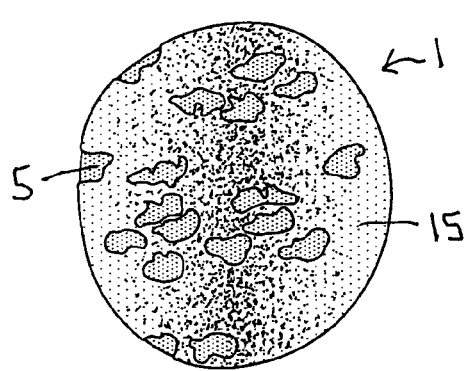
FIG. 3 is a top plan view of the snack chip of FIG. 1.
Figure 4:
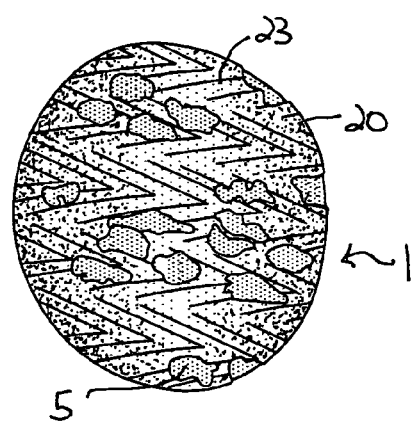
FIG. 4 is a bottom plan view of the snack chip of FIG. 1.
Figure 5:
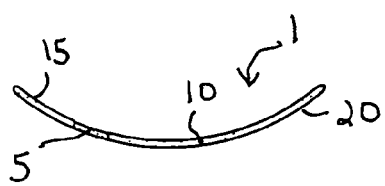
FIG. 5 is a front elevational view of the snack chip of FIG. 1.
Figure 6:
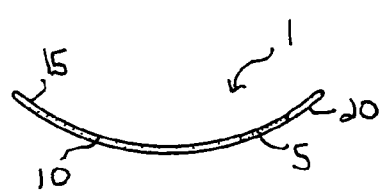
FIG. 6 is a rear elevational view of the snack chip of FIG. 1.
Figure 7:
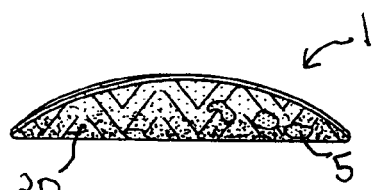
FIG. 7 is a right side elevational view of the snack chip of FIG. 1.
Figure 8:
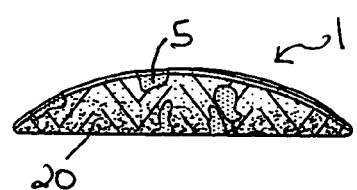
FIG. 8 is a left side elevational view of the snack chip of FIG. 1.

The present invention provides a method and apparatus for making curved or wave snack chips, such as cookie chips, by forming or creating the curved configuration after baking. The curved or wave snack chips of the present invention have a concave surface and an opposing convex surface. Each of the concave and convex surfaces are substantially smooth and at least substantially free of surface bubbles or blisters. The curved or wave chips of the present invention have a crispy, crunchy texture, and may have an at least substantially uniform thickness of less than about 0.10 inches, preferably from 0.07 inch to about 0.09 inch. The degree of curvature may be about 10° to about 45°, generally about 15° to about 25°. The curvature and shape of each chip may be at least substantially uniform and the chips may be stacked, one upon another, in an at least substantially straight column.

In preferred embodiments as shown in FIG. 1 through FIG. 8, the wave chips 1 have a plurality of particulate ingredients 5, such as flavor chips, which extend all the way through the thickness 10 of the chips and are visually apparent at the opposing concave 15 and convex 20 surfaces. The wave forming process and apparatus of the present invention does not result in substantial, or any smearing of the particulate ingredients, such as chocolate chips into the baked dough portion of the chip product. The convex surface of the chips may have subtle band markings 23 from being baked in a band oven on a wire mesh band. In preferred embodiments of the invention, thin, curved or wave cookie chips having a sweet taste and cookie flavor are produced with a chip-like crispy texture. The baked wave chips of the present invention may have a coating or topping, preferably one or more stripes of icing, on its convex or concave surface.

The dough pieces prior to baking may have a thickness of less than about 0.04 inch, for example from about 0.025 inch to about 0.035 inch. The dough pieces expand or leaven upon baking and may have a baked thickness of less than about 0.10 inch, for example, from about 0.07 inch to about 0.09 inch. The thickness of the freshly baked malleable chips is not substantially, if at all changed by the forming process of the present invention. Thus, the malleable baked chips which are subjected to the forming process of the present invention may have a thickness of less than about 0.10 inch, preferably about 0.07 inch to about 0.09 inch. Also, they are substantially flat with substantially no surface bubbles or blisters which can result in crumbling and jamming in the post-bake forming apparatus. The malleable baked chips may have a round, oval, square, rectangular, or irregular shape.

Figure 9:
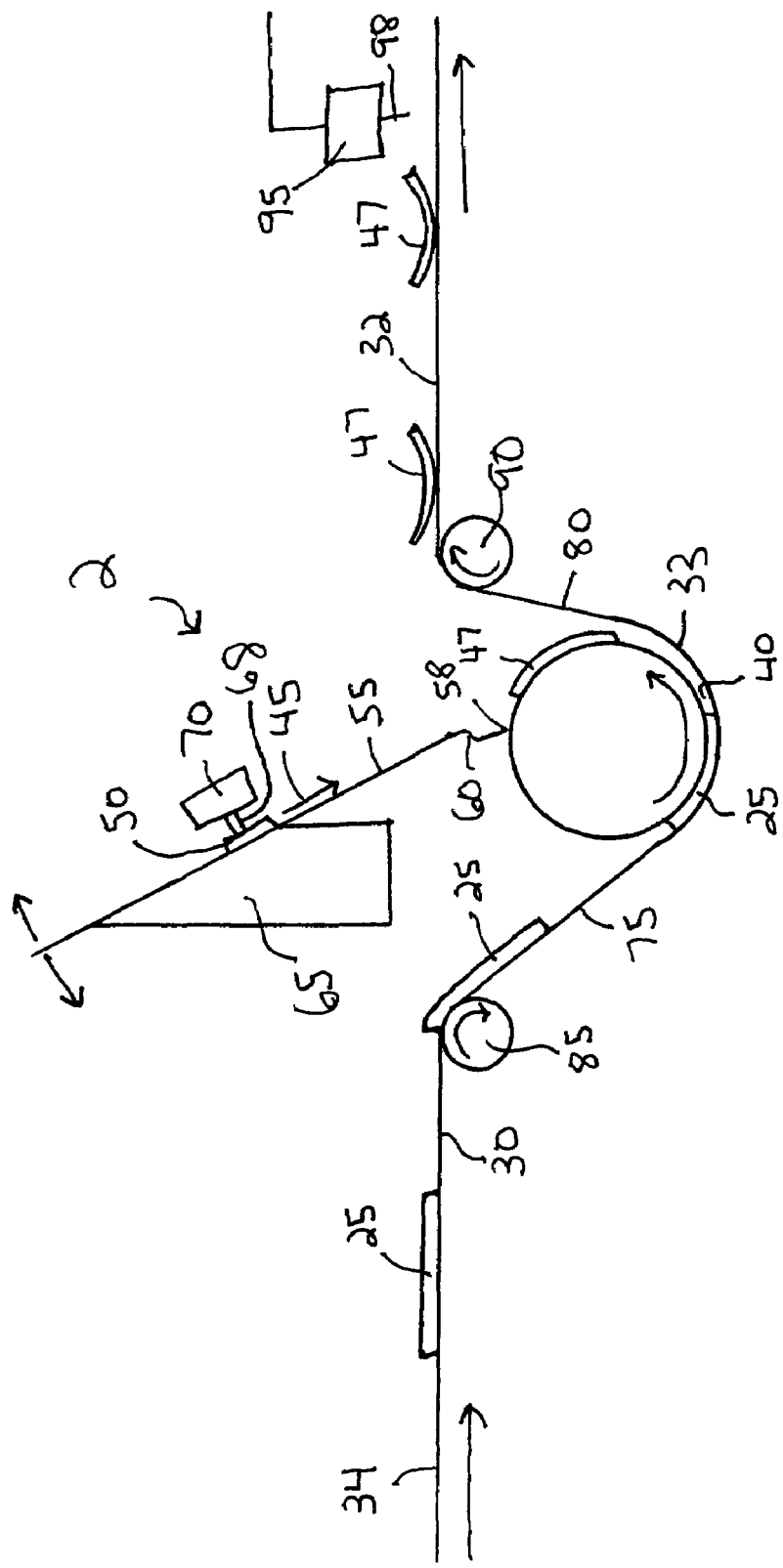
FIG. 9 is a schematic side view of apparatus for producing curved or wave chips in accordance with the present invention.

Curved or wave chips may be produced in accordance with the present invention by baking pieces of dough to obtain at least substantially flat, malleable, baked chips. As shown in FIG. 9, the malleable chips 25 are transported on a conveyer belt 30 to a rotating forming roller 35 to curve or curl the malleable baked chips around the roller. In accordance with the present invention, baked snacks are shaped into a desired, uniform curve or wave shape before they have had sufficient time to cool and set or harden into a flat shape and crispy texture. The malleable baked chips 25 are conveyed, while at least substantially flat against the conveyer belt 30 into a nip or gap 40 formed between the conveyer belt 30 and the rotating forming roller 35. Pressure from the belt causes the chip to adhere to the rotating roller starting at its leading edge and continuing to its trailing edge as it passes through the nip or gap. The chips pass through the nip or gap with no, or substantially no, change in thickness of the pieces.

While adhering to the forming roller 35, the baked chips are cooled upon emerging from the gap by a curtain or sheet of air 45. The chips may also be cooled by a cooling medium which circulates within the rotating forming roller. The curtain of air 45, in addition to cooling the chips and setting the chips in a curved or wave configuration, also removes them or blows them off of the rotating forming roller.

Although post-bake heating may be employed to extend the period of time during which the chips are malleable, the post-bake heating would involve extra equipment and cost, consume extra line space, and may burn, discolor, or dry out the malleable chips. In preferred embodiments, the malleable, baked chips are transferred to the post-bake forming device within a sufficiently short time so as to assure that the baked chips are malleable so as to conform to the shape of the forming roller without the need for any post-bake heating. In preferred embodiments of the invention, the baked pieces are transported from the oven to the nip or gap 40 of the forming device within about 20 seconds, preferably in about 8 to 15 seconds.

Generally, the malleable baked chips 25 entering the nip or gap 40 of the post-bake forming device should have a temperature of about 170° F. to about 190° F. If the temperature is too low the baked chips will not be pliable enough to conform to the shape of the forming roller 35. Although higher temperatures may be employed, if the baked chips are too hot, they may pass through the gap and curl around the forming roller but they may tend to uncurl if they are not sufficiently cooled upon being blown off or upon being removed from the roller.

In preferred embodiments, the curtain of air 45 cools the malleable baked chips at least about 10° F., preferably about 15° F. to about 25° F. to obtain curved or wave chips 47 which at least substantially retain the same configuration after removal from the forming roller 35.

The air pressure employed in the air curtain generating device or air knife 50 should be sufficiently high so as to remove or blow off the adhered, curved wave chips 47 from the rotating roller 35. The pressure may be adjusted so as to remove the chips so that their concave surface rests upon the flat, downstream portion of the conveyer belt. In other embodiments, the pressure may be adjusted so that the removed chips flip so that their convex surface faces upwardly. However, the pressure should not be so high so as to blow the chips excessively downstream or off of the conveyer or otherwise disrupt the attainment of at least substantially uniformly straight rows of wave chips. Generally, the air pressure provided by the air knife may be less than about 5 psig, preferably about 1 psig to about 2 psig.

The air guide 55 is angled and configured so that the air curtain 45 at least substantially travels against the guide and is directed against the roller-adhered chips so as to cool them and lift them from the forming roller 35. The angle of the air guide 55 relative to the plane of the conveyer belt may be adjusted to provide a direction to the air curtain towards the adhered chips so that they are removed in less than one complete revolution of the chips about the roller. The provision of a recessed portion 60 of the air guide 55 at its bottom end helps to prevent the air curtain 45 from being directed too far downstream and helps to provide lift, like an airplane wing, for removal of the chips.

In preferred embodiments the chips are arranged in straight rows across the conveyer belt 30 as shown in FIG. 10, and enter the gap 40 in substantially the same straight row configuration. Also, preferably the curved or wave pieces 47 are removed from the forming roller 35 in a straight line by the air curtain 45 and are deposited in a substantially straight line on the downstream portion 32 of the conveyer belt 30. Use of an air knife 50 which provides substantially even pressure along its length helps to assure that the curved pieces are removed and deposited in a substantially straight line. In embodiments of the invention, conventional row straightening devices may be employed to align the rows of chips for subsequent stacking and packaging and application of toppings. Prior to stacking and packaging, the wave chips may be cooled in a cooling tunnel in conventional manner to about room temperature.

In embodiments of the present invention, a topping ingredient or icing may be applied as a coating or one or more stripes to either the convex or concave surfaces of the chips as they are transported on the conveyor belt downstream of the forming device. The coating may cover a part of the surface or at least substantially all of the surface. In preferred embodiments, one or more stripes, such as a wavy strip may be applied to the chip surface.

In embodiments of the present invention a conventional, continuous, multi-zoned band oven may be employed to bake dough pieces into baked, malleable chips which are generally flat. The flat, baked malleable chips 25 may be made into curved or wave chips 47 which are at least substantially uniformly curved using the chip curving apparatus of the present invention.

The post-bake forming device, or chip curving apparatus 2, of the present invention for making curved or wave chips 47 includes a conveyer belt 30 for transporting baked chips 25 from an oven, and a rotatable forming roller 35 for forming the baked chips into a curve or wave. The roller forms a nip or gap 40 with a curved, angled, or recessed portion 33 of the conveyer belt 30. The baked, at least substantially flat chips 35 are conveyed by the conveyer belt 30 into the curved portion 33 of the belt 30 and through the nip or gap 40 between the belt 30 and the forming roller 35. Upon passing through the nip or gap 40, the malleable baked chips 25 adhere to the forming roller 35 and curl around it to form a curved or wave chip 47 having a curvature which is the same or substantially the same as that of the forming roller. The diameter of the forming roller 35 employed depends upon the degree of curvature desired and the longest dimension of the malleable baked chip in the direction of travel of the belt. Generally, the diameter of the forming roller may be sufficiently large so that the chip may be adhered completely along its length to the roller while permitting its removal in less than a complete revolution and without interfering with entry and exit of chips within the curved portion 33 of the belt 30. In embodiments of the invention, the diameter of the forming roller may be from about 90% to about 130%, preferably from 100% to about 120%, for example about 110%, the maximum length of the malleable baked chip before it enters the curved portion of the belt.

As shown in FIGS. 9 and 10, a device 50 which provides a curtain of cool air 45 is mounted on a housing 65 above the forming roller 35. The device may be jacketed for cooling air and maintaining a constant air temperature. The air may be supplied to the device 50 through a hose 68 from a conventional purified air source 70. The curtain of air 45 lifts off or removes the curved or wave chips 47 from the rotatable roller 35 by a blowing action of the air curtain 45. The blowing action helps to deposit the removed curved or wave chips 47 onto a downstream, at least substantially flat section 32 of the conveyer belt 30.

The device 50 which provides a curtain of air 45 may be a linear air nozzle or "air knife". The air knife 50 is mounted above the rotatable forming roller 35 and malleable chips 25 in an angled position upstream of the forming roller to direct a flow of air from a compressed air supply line at an angle towards the malleable baked chips being formed below on the roller 35. The rotatable forming roller 35 and the linear air nozzle or air knife 50 are oriented at least substantially parallel to each other and normal to the direction of travel of the conveyor belt 30 and chips. The air nozzle 50 receives air from an air supply line 68 that is connected to a compressed air source 70. The air may be purified for use in food manufacture. The air nozzle may be configured as a round cylindrical tube with an elongate, narrow orifice to form a substantially planar airflow across at least substantially the entire width of the forming roller and row of chips. The malleable baked chips are generally cooled by ambient air between the oven and the forming roller. Then, as they are formed on the forming roller the malleable chips are cooled by ambient air and by additional cooling with airflow from the air knife. Linear air nozzles or air knives which may be employed in the present invention are commercially available, such as a Linear Air and Blow-Off Nozzle, made by Exair Corporation of Cincinnati, Ohio.

The device 50 for providing the curtain of air 45 may be mounted on an air flow guide 55, which in turn is mounted upon the housing 65 as shown in FIG. 9. The air flow guide 55 may be in the form of a flat plate having an upstream or upper portion and a downstream or bottom end portion. The air curtain device or air knife 50 may be mounted upon the air flow guide 55 at it upper portion. The downstream or bottom portion of the air flow guide 55 may have a recessed portion 60 relative to the upstream or upper portion so as to provide a lifting effect upon the baked chips 47 which are adhered or curled around the forming roller 35.

The bottom edge 58 of the air flow guide 55 may be juxtaposed or terminated near the surface of the rotating forming roller 35 so as to scrape off any adhered baked chips from the roller which are not removed by the air flow 45. The air flow guide 55 therefore serves to prevent any excessively adhered baked chips from making a complete revolution around the roller 35 and into the upstream area of the curved belt portion.

The air flow guide 55, and the air knife 50 attached thereto, may be mounted at an angle of about 50° to about 60° relative to the flat portions or longitudinal plane of the belt, so as to direct a curtain of air 45 at about that same mounting angle upon the rotating malleable chips. The air flow guide 55, the air knife 50 or other air curtain producing device, and the rotatable forming roller 35 may extend across the width of the conveyer belt 30, as shown in FIG. 10. The mounting angle may be adjustable by movement of the airflow guide using conventional angle adjustment mechanisms, such as a slot and bolt arrangement (not shown), attached to the housing 65.

The curved, angled, or indented portion 33 of the conveyer belt 30 may be formed by providing extra slack in the belt within an area which is substantially unsupported from the underside of the belt. For example, conventional nosers may be provided upstream and downstream of the forming roller with little if any underlying belt supporting structure between the two nosers. The rotatable forming roller may be adjustable in a vertical direction for setting the nip or gap between the bottom-most surface of the roller and the bottom-most, upper, concave surface of the belt. The rotatable forming roller may be driven by a conventional motor and cam arrangement. Conventional roller height adjustment mechanisms may also be employed. The gap or nip between the forming roller and the bottom-most top surface of the belt should be set to permit the baked chip to pass through and adhere to the forming roller without being crushed or substantially compressed.

As shown in FIG. 9, the conveyer belt 30 forms an upstream angle 75 with the rotatable roller 35 and a downstream angle 80 with the rotatable roller 35. The angles may be measured between the horizontal plane passing through the nip or lowest point in the belt, and the plane of the angled portion of the belt. Both the upstream and downstream angles should be sufficiently large so as to permit the chips to fully curve around and adhere to the forming roller and to then be blown off the roller and back onto the downstream portion 32 of the belt 30 in less than one revolution of the roller 35. The upstream angle 75 should be sufficiently large to permit the baked chips 25 to lie flat against the belt before they are adhered to the forming roller 35 and before passing through the nip or gap 40. The downstream angle 80 should be sufficiently large to permit the adhered chips 47 to be removed from the forming roller 35 by the air curtain 45. However, the angle 80 should not be so large as to result in the blown off chips falling into and remaining in the curved portion of the belt downstream of the forming roller so as to impede downstream uniform flow of the chips. The downstream angle should also be set so that the chips fall on or are deposited upon a substantially flat, horizontal portion 32 of the belt 30 without substantially changing the curved or wave configuration imparted to the chips by the forming roller.

In preferred embodiments of the present invention, an upstream roller 85 and a downstream roller 90, relative to the forming roller 35, are provided as shown in FIG. 9 and FIG. 10. The conveyer belt 30 may pass over the upstream roller 85 and over the downstream roller 90 but under the forming roller 35. All three rollers, the forming roller, the upstream roller, and the downstream roller may be jacketed and supplied with a cooling medium for maintaining a constant air flow temperature.

The upstream roller 85 and the downstream roller 90 may each be adjustable in the horizontal direction, or in a direction at least substantially parallel to the longitudinal axis or surface of the flat portion of the conveyer belt. In addition, the upstream and the downstream rollers may be adjustable in the vertical direction relative to the flat portions 32, 34 of the conveyer belt 30. The upstream angle 75 and the downstream angle 80 may be adjusted by movement of the upstream and downstream rotatable rollers 85, 90 respectively. For example, to increase the upstream angle 75, the upstream roller 85 may be moved further upstream away from the rotating forming roller 35. To decrease the upstream angle 75, the upstream roller 85 may be moved closer towards the forming roller 35. The downstream angle 80 may be increased by moving the downstream roller 90 further away or further downstream from the forming roller 35. A decrease in the downstream angle 80 may be achieved by moving the downstream roller 90 further upstream, or closer to the forming roller 35. The downstream and the upstream angles may be the same or different. In embodiments of the invention, the upstream angle 75 may range from about 15° to about 60°, depending upon the size, length, or diameter of the baked chip. For example, as the length or diameter of the chips in the direction of travel of the belt increases, the angle may decrease so as to permit more time for the chip to lie flat on the belt as it enters and travels within the curved or angled area of the belt. In embodiments of the invention, the downstream angle 80 may also range from about 15° to about 60° depending upon the size and degree of curvature of the curved or wave chips 47. Generally, as the dimension of the chip increases in the direction of flow, smaller angles may be needed so as to decrease the distance of belt-to-chip-to-roller contact and thereby increase the time or distance available for separation of the adhered chip from the forming roller 35.

A topping applicator 95 may be mounted downstream of the forming roller 35 and above the top surface of the conveyer belt 30. The topping applicator 95 may be employed for applying a coating, deposit, or one or more streams 98 of toppings to a surface of each curved or wave chip 47 as they are transported on the conveyer belt. The topping applicator 95 may be conventional equipment such as those used to apply straight, curved, wavy, wiggly, or sinusoidal stripes to each piece. Exemplary of conventional equipment which may be employed to apply a plurality of wiggly stripes to each piece is a perforated decorative stringer, such as a Woody Stringer, manufactured by Woody Associates, Inc., York, Pa.

The curved or wave chips 47 may be transported by the conveyer belt to a conventional cooling tunnel for further cooling. After cooling, the chips may be sent to a stacking device and then packaged in a cannister or they may be packaged in bags using conventional packaging equipment.

The baked snacks of the present invention include reduced fat, low-fat, and no-fat baked products, as well as full-fatted. They may have the taste or flavor of a wheat-based cookie, but the appearance and crispy, crunchy texture of a chip. The thin, malleable, wheat-based baked chips which may be subjected to the post-bake forming method and apparatus of the present invention may be produced using known cookie, cracker, or fabricated baked chip manufacturing equipment and methods. For example, in embodiments of the present invention, dough pieces may be obtained by sheeting a dough and forming it into thin dough pieces as disclosed in copending U.S. application Ser. No. 10/371,547, filed Feb. 21, 2003 for "PRODUCTION OF THIN, IRREGULAR CHIPS WITH SCALLOPED EDGES AND SURFACE BUBBLES" in the names of Mihalos et al, U.S. Pat. Nos. 5,747,092 and 5,980,967 each to Carey et al., and U.S. Pat. No. 6,491,959 to Chiang et al., the disclosures of which are herein incorporated by reference in their entireties. In the present invention, dough sheet lamination is generally not needed because excessive bubbling and blister formation which may interfere with the post-bake forming operation is not desired. However, lamination may optionally be employed to add robustness. In other embodiments of the present invention, dough sheeting may not be needed. The dough pieces may be produced using conventional rotary molding or wire cutting techniques which may result in less scrap or recycle.

In embodiments of the invention, the dough pieces may be made from a sheeted dough, by feeding dough from a hopper into a conventional four roll dough sheeter to obtain a dough sheet. The dough sheet may be conveyed by a conveyor to the nip of a pair of counterrotating auxiliary gauge rolls and compressed into a sheet. The compressed sheet may be transported by a second conveyer to the nip of a second pair of counterrotating auxiliary gauge rolls and further compressed into a thinner sheet. The thinner compressed sheet may be transported by a third conveyer to the nip of a pair of jacketed counterrotating final gauge rolls and further compressed into a thin sheet. The final gauge rolls may be equipped with a conventional temperature monitoring and controlling device for control of the gauge roll surface temperatures. The thin sheet may be transferred to a fourth, downstream conveyer for cutting into individual pieces by a rotary cutter.

To increase the time during which the baked chip pieces remain sufficiently malleable for post-bake forming into curved or wave chip products, a pregelatinized waxy maize starch is included in the dough composition. It is believed that the film-forming pregelatinized starch forms a thin film which helps to trap and retain moisture for malleability, particularly when the dough is baked at low temperatures. Also, inclusion of a substantial amount of sugar in the dough, with no or substantially no potato ingredients, provides a cookie taste or flavor rather than a potato chip flavor. It is also believed that the sugar helps to maintain malleability of the baked chips after baking by holding water. Upon cooling during the forming step, it is believed that the readily crystallizable sugars, such as sucrose crystallize and help to set the chips in a curved or wave configuration imparted by the forming roller. The crystallization resistant sugars may also contribute to the attainment of a crispy, crunchy texture.

Pregelatinized waxy starches or pregelatinized high amylopectin-content starches which may be used in the present invention include pregelatinized waxy maize starch, pregelatinized waxy rice starch, and mixtures thereof. In embodiments of the invention, a pregelatinized waxy starch for achieving cohesiveness, dough extensibility, dough machinability, and extended time of malleability in the baked chips is a modified waxy maize starch such as Modified Corn Starch X-Pand'R F4-612 produced by A.E. Staley Manufacturing Company. The preferred pregelatinized waxy maize starch is not chemically modified nor acid hydrolyzed. The pregelatinized waxy starch preferably has a moisture content of less than or equal to about 6% by weight and a pH of about 5 to about 6. The Brabender neutral viscosity of the pregelatinized waxy starch may be at least 680 BU at 25° C., with the time required to reach peak viscosity at 25° C. being a maximum of 20 minutes. The particle size distribution of the pregelatinized waxy starch may be less than or equal to about 20% by weight retained on a 50-mesh screen and less than or equal to about 30% passing through a 200-mesh screen. If the particle size is too small, the pregelatinized starch tends to hydrate predominately on the surface.

The amount of the pregelatinized waxy starch which may be used in embodiments of the present invention range from about 1.5% by weight to about 10% by weight, preferably from about 2.5% by weight to about 6% by weight based upon the weight of the wheat flour.

Process-compatible ingredients, which can be used to modify the texture of the products produced in the present invention, include sugars such as sucrose, fructose, lactose, dextrose, galactose, maltodextrins, corn syrup solids, hydrogenated starch hydrolysates, protein hydrolysates, glucose syrup, mixtures thereof, and the like. Reducing sugars, such as fructose, maltose, lactose, and dextrose, or mixtures of reducing sugars may be used to promote browning. Fructose is the preferred reducing sugar, because of its ready availability and its generally more enhanced browning and flavor-development effects. Exemplary sources of fructose include invert syrup, high fructose corn syrup, molasses, brown sugar, maple syrup, mixtures thereof, and the like.

The texturizing ingredient, such as sugar, may be admixed with the other ingredients in either solid or crystalline form, such as crystalline or granulated sucrose, granulated brown sugar, or crystalline fructose, or in liquid form, such as sucrose syrup or high fructose corn syrup. In embodiments of the invention, humectant sugars, such as high fructose corn syrup, maltose, sorbose, galactose, corn syrup, glucose syrup, invert syrup, honey, molasses, fructose, lactose, dextrose, and mixtures thereof, may be used to reduce hardness of the baked product and provide flavor and color.

In addition to the humectant sugars, other humectants, or aqueous solutions of humectants which are not sugars or possess a low degree of sweetness relative to sucrose, may also be employed in the dough. For example, glycerol, sugar alcohols such as mannitol, maltitol, xylitol and sorbitol, and other polyols, may be used as humectants. Additional examples of humectant polyols (i.e. polyhydric alcohols) include glycols, for example, propylene glycol and hydrogenated glucose syrups. Other humectants include sugar esters, dextrins, hydrogenated starch hydrolysates, and other starch hydrolysis products.

In embodiments of the present invention, the total sugar solids content, or the humectant texturizing-ingredient content, of the doughs may range from zero up to about 100% by weight, based upon the weight of the wheat flour, with savory snacks generally possessing only up to about 25% by weight of total sugar solids. For the production of sweet chips, such as cookie chips, the total sugar solids content is generally greater than 25% by weight, preferably greater than about 28% by weight, most preferably from about 30% by weight to about 80% by weight, for example from about 33% by weight to about 70% by weight, based upon the weight of the wheat flour. The preferred sugars for inclusion in the doughs of the present invention are crystalline sucrose and high fructose corn syrup. For example, in embodiments of the invention crystalline sucrose may be included in the dough in amounts ranging from about 25% by weight to about 55% by weight, and the sugar solids content from high fructose corn syrup may be from about 8% by weight to about 15% by weight, based upon the weight of the wheat flour.

The wheat flour used in the wheat-based snacks of the present invention may be a flour of common wheat or *triticum aestivum*, and/or a flour of club wheat. Durham wheat generally provides a texture which is hard rather than crisp. In embodiments of the invention, it may be included in amounts which do not adversely affect texture, for example, up to about 10% by weight of the wheat flour. Common wheat flour is preferred. The wheat flour may be from winter wheat or spring wheat, either of which may be soft or hard. The soft or hard wheats may be either red or white. Mixtures of different wheat flours may be used in the present invention. The wheat flours used in the present invention are preferably not extensively bleached, because extensively bleached flours tend to produce a cake-like, non-crispy texture. The protein or gluten content of the wheat flour should be sufficient to provide a sheetable dough at temperatures of from about room temperature to about 125° F. Conventional wheat flours used for cookie and cracker production may be used in the present invention. Exemplary gluten contents of the wheat flours may range from about 7% to about 11% by weight of the flour.

The wheat flour may be used in an amount of from about 30% by weight to about 80% by weight, preferably from about 40% by weight to about 65% by weight, based upon the weight of the dough. Other flours, such as rice flour, corn flour, oat flour, and the like, tend to result in a mealy, styrofoam-like, less crunchy texture. They may be used in amounts which do not adversely affect flavor and a crispy, crunchy texture.

In embodiments of the invention potato starch ingredients may optionally be used in amounts which do not adversely affect flavor to control a crispy, crunchy texture and to control or reduce bubbling or blistering. In embodiments of the invention a pregelatinized potato starch may be used in an amount of from about 1.5% by weight to about 20% by weight, for example from about 3% by weight to about 13% by weight, based upon the weight of the wheat flour. An example of a pregelatinized potato starch which may be employed is cross-linked, non-esterified di-starch phosphate of potato starch, which is cold-water-swelling, such as Paselli P, manufactured by Avebe America, Inc.

An optional modified potato starch may be employed in an amount of up to about 20% by weight, for example from about 5% by weight to about 18% by weight, based upon the weight of the wheat flour. An example of a modified potato starch which may be employed is an esterified potato starch such as Perfectamyl AC, manufactured by Avebe America, Inc. It is a raw, acetylated, but not crosslinked, potato starch.

In embodiments of the invention a pregelatinized potato starch which is unmodified, and not cross-linked, such as Paselli WA-4 may be utilized. In such embodiments, an optional modified potato starch, such as Perfectamyl AC is generally not needed and the total amount of potato starches may be reduced. For example, in embodiments where an unmodified, non-cross-linked pregelatinized potato starch such as Paselli WA-4 is employed, exemplary total amounts of potato starches may be from about 2 wt. % to about 7 wt. %, based upon the weight of the wheat flour. The use of the unmodified, non-cross-linked potato starch requires less water to be used in making the dough.

Unless otherwise indicated, all weight percentages are based upon the total weight of all ingredients forming the doughs or formulations of the present invention, except for inclusions such as flavor chips, nuts, raisins, and the like. Thus, "the weight of the dough" does not include the weight of inclusions.

The moisture contents of the doughs of the present invention should be sufficient to provide the desired consistency to enable proper forming, machining, and cutting of the dough. The total moisture content of the doughs of the present invention will include any water included as a separately added ingredient, as well as the moisture provided by flour (which usually contains about 12% to about 14% by weight moisture), and the moisture content of other dough additives included in the formulation, such as high fructose corn syrup, invert syrups, or other liquid humectants.

Taking into account all sources of moisture in the dough or batter, including separately added water, the total moisture content of the doughs or batters of the present invention is generally less than about 50% by weight, preferably less than about 35% by weight, based upon the weight of the dough or batter. Generally, lower dough moisture contents results in lower heating requirements, lower starch gelatinization, and less blistering and bubbling. In producing curved or wave cookie chips in accordance with the present invention, the doughs may generally have a moisture content of less than about 30% by weight, generally from about 10% by weight to about 20% by weight, based upon the weight of the dough.

Oleaginous compositions which may be used to obtain the doughs and baked goods of the present invention may include any known shortening or fat blends or compositions useful for baking applications, and they may include conventional food-grade emulsifiers. Vegetable oils, lard, marine oils, and mixtures thereof, which are fractionated, partially hydrogenated, and/or interesterified, are exemplary of the shortenings or fats which may be used in the present invention. Edible reduced- or low-calorie, partially digestible or non-digestible fats, fat-substitutes, or synthetic fats, such as sucrose polyesters or triacyl glycerides, which are process-compatible may also be used. Mixtures of hard and soft fats or shortenings and oils may be used to achieve a desired consistency or melting profile in the oleaginous composition. Exemplary of the edible triglycerides which can be used to obtain the oleaginous compositions for use in the present invention include naturally occurring triglycerides derived from vegetable sources such as soybean oil, palm kernel oil, palm oil, rapeseed oil, safflower oil, sesame oil, sunflower seed oil, and mixtures thereof. Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Preferred oleaginous compositions for use in the present invention comprise soybean oil.

In producing curved or wave cookie chips in accordance with the present invention, the doughs may generally have a fat or oil content of less than about 30% by weight, generally from about 10% by weight to about 20% by weight, based upon the weight of the flour.

Baked goods which may be produced in accordance with the present invention include reduced calorie baked goods which are also reduced fat, low fat or no-fat products. As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers used as snacks and for cookies, the reference amount is 30 grams. Thus, the fat content of a low-fat cracker or cookie would therefore be less than or equal to 3 grams of fat per 50 grams or less than or equal to about 6% fat, based upon the total weight of the final product. A no-fat accompaniment cracker would have a fat content of less than 0.5 grams per 15 grams or less than about 3.33%, based upon the weight of the final product.

In addition to the foregoing, the doughs employed in the invention may include other additives conventionally employed in crackers and cookies. Such additives may include, for example, milk by-products, enzyme modified milk powder, whey, edible fiber such as oat fiber, corn bran, wheat bran, oat bran, rice bran, egg or egg by-products, cocoa, peanut butter, vanilla or other flavorings, flour substitutes or bulking agents, such as polydextrose, hollocellulose, microcrystalline cellulose, mixtures thereof, and the like, as well as inclusions or particulates such as nuts, raisins, coconut, flavored chips such as chocolate chips, butterscotch chips, white chocolate chips, peanut butter chips, caramel chips, and the like in conventional amounts. In embodiments of the invention, these additives, such as chocolate chips or other flavor chips, may be employed in amounts up to about 20% by weight, based upon the weight of the dough.

A source of protein, which is suitable for inclusion in baked goods, may be included in the doughs of the present invention to promote Maillard browning. The source of protein may include non-fat dry milk solids, dried or powdered eggs, mixtures thereof, and the like. The amount of the proteinaceous source may, for example, range up to about 5% by weight, based upon the weight of the dough.

The dough compositions of the present invention may contain up to about 5% by weight of a leavening system, based upon the weight of the dough. Exemplary of chemical leavening agents or pH-adjusting agents which may be used include alkaline materials and acidic materials such as sodium bicarbonate, ammonium bicarbonate, calcium acid phosphate, sodium acid pyrophosphate, diammonium phosphate, tartaric acid, mixtures thereof, and the like. Yeast may be used alone or in combination with chemical leavening agents.

The doughs of the present invention may include antimycotics or preservatives, such as calcium propionate, potassium sorbate, sorbic acid, and the like. Exemplary amounts may range up to about 1% by weight of the dough, to assure microbial shelf-stability.

Emulsifiers may be included in effective, emulsifying amounts in the doughs of the present invention. Exemplary emulsifiers which may be used include, mono- and diglycerides, polyoxyethylene sorbitan fatty acid esters, lecithin, stearoyl lactylates, and mixtures thereof. Exemplary of the polyoxyethylene sorbitan fatty acid esters which may be used are water-soluble polysorbates such as polyoxyethylene (20) sorbitan monostearate (polysorbate 60), polyoxyethylene (20) sorbitan monooleate (polysorbate 80), and mixtures thereof. Examples of natural lecithins which may be used include those derived from plants such as soybean, rapeseed, sunflower, or corn, and those derived from animal sources such as egg yolk. Soybean-oil-derived lecithins are preferred. Exemplary of the stearoyl lactylates are alkali and alkaline-earth stearoyl lactylates such as sodium stearoyl lactylate, calcium stearoyl lactylate, and mixtures thereof. Exemplary amounts of the emulsifier which may be used range up to about 3% by weight of the dough.

The doughs which are employed in the present invention may be produced by admixing the dry ingredients such as sucrose, dry flavoring and additive ingredients, such as whey, cocoa, and salt, with the pregelatinized waxy maize starch to obtain an at least substantially homogeneous dry preblend. The dry preblend may then be creamed with the liquid ingredients such as shortening or fat, high fructose corn syrup, water, and emulsifier to obtain an at least substantially homogeneous creamed mixture. The creamed mixture may then be admixed with the flour, leavening agents, and optionally any remaining other minor dry ingredients such as oat fiber, salt or whey, to obtain an at least substantially homogeneous dough. Inclusions, such as particulate flavoring ingredients, such as chocolate chips may then be admixed with the dough to obtain an least substantially homogeneous finished dough.

The dough may then be sheeted, wire cut, extruded, coextruded, or rotary molded using conventional equipment to obtain dough pieces.

While baking times and temperatures will vary for different dough or batter formulations, oven types, etc., in general, commercial baking times may range from about 2.5 minutes to about 8 minutes, and baking temperatures may range from about 250° F. to about 475° F.

The baked products of the present invention may have a relative vapor pressure ("water activity") of less than about 0.7, preferably less than about 0.6, for preservative free microbial shelf-stability. The water content of the products is generally less than about 6% by weight, for example, from about 0.25% by weight to about 4% by weight, based upon the weight of the baked product, exclusive of inclusions. The flour, pregelatinized waxy maize starch, one or more sugars, and other ingredients are least substantially uniformly distributed throughout the curved or wave baked products, such as the cookie chips, of the present invention.

Conventional toppings and icings or filler creams known in the baking art may be applied onto the surface of the curved or wave chip products of the present invention. For example, icings comprising a mixture of one or more sugars and shortening or fat may be applied as stripes upon the cookie wave chips of the present invention.

The present invention is further illustrated in the following examples, where all parts, ratios, and percentages are by weight, all temperatures are in ° F., and all pressures are atmospheric unless otherwise stated:

EXAMPLES 1-2

The ingredients and their relative amounts, which may be used to produce a cohesive, machinable dough for producing a sweet, wheat-based snack chip having a curved or wave configuration, a crispy, chip-like texture, a chocolate chip cookie flavor, and visually apparent chocolate chips are:

| Dough Ingredients | Example 1 Parts by weight | Example 2 Parts by weight |
|---|---|---|
| GROUP 1 | | |
| Granulated sucrose | 25 | 32.94 |
| Pregelatinized waxy maize starch N (X-Pand'R) | 4 | 3.5 |
| Vanillin | 0.03 | 0.02 |
| GROUP 2 | | |
| Water (120° F.) | 9 | 8 |

-continued

| Dough Ingredients | Example 1 Parts by weight | Example 2 Parts by weight |
|---|---|---|
| GROUP 3 | | |
| Lecithin | 0 | 1 |
| Water (cold 45°) | 8 | 8 |
| Soybean Spray Oil | 13.25 | 16.5 |
| High fructose corn syrup | 13 | 0 |
| Caramel flavor | 0.03 | 0.03 |
| Citric Acid | 0 | 0.23 |
| GROUP 4 | | |
| Medium wheat flour | 100 | 100 |
| Whey | 2 | 4.69 |
| Salt | 1.25 | 1 |
| Sodium bicarbonate | 2 | 1 |
| Calcium phosphate, monobasic monohydrate | 0.25 | 0.25 |
| GROUP 5 | | |
| Chocolate Chips (15000 count) | 27 | 23 |
| TOTAL | 204.81 | 200.16 |

In Examples 1 and 2 the dough may be produced by first dry blending the Group 1 ingredients for about one minute at low speed. The Group 2 ingredients may then be added to the Group 1 ingredients with mixing for about five minutes at high speed, followed by addition of the Group 3 ingredients with mixing for an additional five minutes at low speed. The Group 4 ingredients may then be added and mixing may be continued for nine minutes at high speed with carbon dioxide being added for about 30 to 60 seconds within the nine minute mixing time. The chocolate drops may then be added and mixed for three minutes at low speed to obtain a substantially homogeneous dough.

The dough may be placed onto a lay-time conveyor for about 60 minutes for hydration purposes. The dough may then be transferred to a sheeter and formed into a sheet. Once the sheet is formed, it may be reduced in thickness in gradual stages by at least two sets of non-tapered reduction rolls. Equipment for the application of conditioned air may be available to reduce sticking of the dough sheet to the surface of the rolls.

The dough sheet may be passed through the final gauge rolls and sheeted to obtain a dough sheet thickness of about 0.028 inch to about 0.032 inch. To allow for proper release of the sheet, the final gauge roll surface temperature may be maintained and controlled between about 87-95° F. by, for example, an internally circulating liquid.

The sheet may then be cut into a plurality of uniformly oval shaped pieces having a length in the machine direction of about 2.3 inches and a width in the transverse direction of about 2.16 inches. The dough pieces, arranged in substantially uniformly straight rows, may then be transferred to a wire mesh oven band using a pan-on conveyor and baked in a multi-zone, continuous band oven. The product may be baked for about 3.75 minutes at temperatures ranging from about 280° F. to about 400° F. to obtain a moisture content of about 1.25% by weight to about 1.5% by weight in the final product.

The malleable, baked product exiting from the band oven is flat with essentially no surface blisters or bubbles. It may be transferred on a conveyor belt to a post-bake curving or wave production device as shown in FIGS. 9 and 10 to obtain a curved cookie chip with visually apparent chocolate chips extending through the product as shown in FIGS. 1-8.

The diameter of the forming roller may be about 2⅝ inches. The air knife, manufactured by ExAir, and the airflow guide may be set at an angle of about 53° to about 55°. The upstream belt angle may be set at about 40°, and the downstream belt angle may be set at about 60°. The air knife pressure may be set at about 1.5 psig.

The transfer time from the band oven to the post-bake curving or wave production device for the malleable, baked pieces may be about 14 seconds. The malleable baked pieces entering the nip or gap between the curved portion of the belt and the forming roller may have a temperature of about 180° F. The air knife may cool the hot, malleable chips by about 20° F. to a temperature of about 160° F. to set the curvature of the chips to substantially the same curvature as the forming roller. The wave chips may be transferred by the conveyor downstream to a cooling tunnel and cooled to room temperature and then packaged. The cookie wave chips may have a thickness of about 2 mm.

EXAMPLE 3

The ingredients and their relative amounts, which may be used to produce a cohesive, machinable dough for producing a sweet, wheat-based snack chip having a curved or wave configuration, a crispy, chip-like texture and a chocolate cookie flavor are:

| Dough Ingredients | Example 1 Parts by weight |
|---|---|
| GROUP 1 | |
| Granulated sucrose | 54 |
| Whey | 2 |
| Pregelatinized waxy maize starch N (X-Pand'R) | 5 |
| Vanillin | 0.04 |
| Salt | 1.5 |
| Cocoa | 15 |
| GROUP 2 | |
| Water (140° F.) | 20.5 |
| Lecithin | 0.75 |
| Soybean Spray Oil | 18.5 |
| High fructose corn syrup | 15 |
| GROUP 3 | |
| Medium wheat flour | 100 |
| Oat fiber | 2 |
| Sodium bicarbonate | 1.75 |
| Ammonium bicarbonate (dissolved) | 0.25 |
| TOTAL | 236.29 |

In Example 3 the dough may be produced by first dry blending the Group 1 ingredients for about three minutes at low speed. The Group 2 ingredients may then be added to the Group 1 ingredients with mixing for about three minutes at low speed, with two pounds of water from Group 1 being held to dissolve the ammonium bicarbonate in Group 3. The Group 3 ingredients may then be added and mixing may be continued for ten minutes at high speed obtain a substantially homogeneous dough. The dough may be processed as in Examples 1 and 2 to obtain chocolate flavored wave chips except the bake time may be about four minutes.

We claim:

1. A method for making a curved or wave chip comprising:
    a) baking pieces of dough to obtain malleable baked chips,
    b) transporting the malleable baked chips on a conveyer belt between a nip or gap formed between the conveyer belt and a rotating forming roller to curve or curl the malleable baked chips around the roller,
    c) subjecting the malleable baked chips to a curtain of air to cool and set the chips in a curved or wave configuration while on said rotating roller and to remove the curved or wave chips off of the rotating forming roller, and
    d) transporting the removed curved or wave chips on said conveyor belt downstream of the rotating forming roller.

2. A method as claimed in claim 1 wherein said malleable baked chips are cooled at least about 10° F. by said curtain of air to set the curved chip in a curved or wave configuration.

3. A method as claimed in claim 1 wherein said malleable baked chips are cooled about 15° F. to about 25° F. by said curtain of air to set the curved chips in a curved or wave configuration.

4. A method as claimed in claim 1 wherein said malleable baked chips entering said nip or gap have a temperature of about 170° F. to about 190° F.

5. A method as claimed in claim 1 wherein said malleable baked chips are transported from the exit of a band oven to said nip or gap within about 20 seconds.

6. A method as claimed in claim 1 wherein said curved or wave chip is a cookie chip.

7. A method as claimed in claim 1 wherein the dough comprises a pregelatinized waxy maize starch.

8. A method as claimed in claim 1 wherein the dough is a wheat-based dough.

9. A method as claimed in claim 1 wherein the malleable baked chips entering said nip or gap are at least substantially flat and at least substantially free of surface bubbles or blisters.

10. A method as claimed in claim 1 wherein said dough comprises wheat flour and at least one sugar, the total sugar solids content of said dough being about 30% by weight to about 80% by weight, based upon the weight of wheat flour.

11. A method as claimed in claim 1 wherein the curved or wave chips comprise particulate flavoring ingredients which are visually apparent from opposing concave and convex surfaces of the curved or wave chips.

12. A method as claimed in claim 1 wherein icing is deposited on the surface of the curved or wave chips.

13. A method as claimed in claim 1 wherein said rotating forming roller is located between an upstream roller and a downstream roller, and said belt passes over said upstream and downstream rollers and under said rotating forming roller.

14. A method as claimed in claim 13 wherein said nip or gap is adjustable by horizontal movement of said upstream and downstream rollers and vertical movement of said rotating forming roller.

15. A method for making curved or wave cookie chips, comprising:
    a) forming thin, flexible cookies comprising a pregelatinized waxy maize starch into a curved or wave configuration having a substantially concave surface and an opposing substantially convex surface, wherein said thin, flexible cookies are formed into said curved or wave configuration on a rotating roller, and the pregelatinized waxy maize starch increases the time during which the flexible cookie remains sufficiently malleable for forming into said curved or wave configuration, and b) cooling the flexible cookies with air to set the cookies in said curved or wave configuration while on said rotating roller and to obtain a crispy.

16. A method as claimed in claim 15 wherein said flexible cookies which are formed into said curved or wave configuration are at a temperature of from about 170° F. to about 190° F., and the flexible cookies are cooled at least about 10° F. by said air to set the cookies in said curved or wave configuration.

17. A method as claimed in claim 16 wherein said flexible cookies are cooled about 15° F. to about 25° F. by a curtain of air to set the cookies in said curved or wave configuration.

18. A method as claimed in claim 15 wherein said flexible cookies are on said rotating roller for less than one rotation of the roller.

19. A method as claimed in claim 15 wherein said flexible cookies have a thickness of less than about 0.04 inches.

20. A method as claimed in claim 16 wherein the flexible cookies are at least substantially flat and at least substantially free of surface bubbles or blisters.

21. A method as claimed in claim 20 wherein the cookie chips comprise particulate flavoring ingredients which are visually apparent from opposing concave and convex surfaces of the curved or wave chips.

22. A method as claimed in claim 20 wherein icing is deposited on the surface of the curved or wave chips.

23. A method as claimed in claim 20 wherein the cookie chips are at least substantially uniformly curved or waved and stackable upon each other.

24. A method as claimed in claim 15 wherein the thin, flexible cookies are obtained by baking dough pieces, and the thin flexible cookies are formed into said curved configuration while still flexible from said baking.

25. A method as claimed in claim 24 wherein said baking is performed in a continuous band oven.

26. A method as claimed in claim 25 wherein said thin, flexible cookies are transferred from said band oven to said rotating roller in less than about 20 seconds.

27. A method as claimed in claim 1 wherein the curved or wave pieces are removed from the forming roller in a straight line by the air curtain and are deposited in a substantially straight line on a downstream portion of the conveyer belt.

28. A method as claimed in claim 15 wherein the curved or wave pieces are removed from said roller in a straight line by an air curtain and are deposited in a substantially straight line on a downstream portion of a conveyer belt.

* * * * *

UNITED STATES PATENT AND TRADEMARK OFFICE
CERTIFICATE OF CORRECTION

PATENT NO. : 7,332,189 B2  Page 1 of 1
APPLICATION NO. : 10/724665
DATED : February 19, 2008
INVENTOR(S) : Mihalos et al.

It is certified that error appears in the above-identified patent and that said Letters Patent is hereby corrected as shown below:

At column 19, line 3 (claim 15 line 15) of the printed patent, after "crispy" insert --, chip-like texture--.

Signed and Sealed this

Twenty-first Day of October, 2008

JON W. DUDAS
*Director of the United States Patent and Trademark Office*